: # 3,013,089
CONVERSION OF HYDROCARBONS
Lynn H. Estes and Walter R. Knox, El Dorado, Ark., assignors to Monsanto Chemical Company, St. Louis, Mo., a corporation of Delaware
No Drawing. Filed Jan. 4, 1960, Ser. No. 21
11 Claims. (Cl. 260—673.5)

The present invention relates to the catalytic conversion of hydrocarbons, and more particularly, to the conversion of paraffin hydrocarbons to aromatic hydrocarbons by contacting said paraffin compounds under suitable reaction conditions with a catalyst capable of dehydrogenation and cyclization of them to aromatic compounds.

A demand for high purity aromatic hydrocarbons in the plastics, automotive, and other industries is placing an increasing emphasis on new and improved methods of aromatic synthesis. Also the automotive industry's demand for high octane motor fuels is causing the economic value of the low octane valued n-paraffin hydrocarbons to decrease. Therefore, it is logical that methods of converting the lower valued n-paraffin hydrocarbons to the higher valued aromatic hydrocarbons would receive considerable attention.

Methods of converting paraffinic and other hydrocarbons to aromatic hydrocarbons are well known to the art. Several commercial processes for the conversion of non-aromatic to aromatic hydrocarbons are in operation today. However, in all of these commercial processes, called reforming processes, the lower molecular weight n-paraffins such as n-hexane go through with little or no conversion to aromatics. The aromatics produced from these reforming operations are derived mostly from the dehydrogenation and dehydroisomerization of naphthenes.

Dehydrogenation-cyclization catalysts and processes have found little or no commercial application. Several reasons are responsible for this. Primary among these are poor yields, poor catalyst life, inability to regenerate, a high ratio of regeneration time to synthesis time, and necessity of relatively pure n-paraffin feed.

It is then an object of this invention to provide an improved method for the dehydrogenation-cyclization of paraffin hydrocarbons to aromatic hydrocarbons. It is a particular object of this invention to provide a new and novel catalyst for the process of converting n-paraffin hydrocarbons to aromatic hydrocarbons. A more specific object of this invention is to provide a new and novel catalyst for the process of converting lower molecular weight liquid n-paraffin hydrocarbons such as hexane to the corresponding aromatic hydrocarbons by dehydrogenation-cyclization.

In fulfillment of the object set forth above it has been discovered that a catalyst comprising an oxide of antimony together with the oxide of an element from the left hand column of group VI of the periodic table and an oxide of an alkali, metal, e.g., sodium, potassium, rubidium, cesium, etc., and supported on a support of suitable chemical and physical properties will cause dehydrocyclization of paraffin hydrocarbons to aromatic hydrocarbons with good yields. A catalyst of this type also decreases the rate of deposition of carbonaceous materials, thus increasing the catalytic reaction time allowable between regenerations or burn offs of the deposited carbon. This, of course, also contributes to a longer catalyst life.

The following examples are given to specifically illustrate the invention described herein. These examples are not, however, to be in any manner construed as limiting the objects, applications, or conditions of the invention herein set forth.

Example I

A n-hexane concentrate containing 97.5 mol percent n-hexane and 2.5 mol percent methylcyclopentane was passed through a catalytic reactor containing a dehydrogenation-cyclization catalyst. The catalyst was composed of 9 percent by weight $Cr_2O_3$, 2.65 percent by weight $Sb_2O_4$, and 0.7 percent by weight $K_2O$ supported on ⅛ inch diameter alumina pellets of 125 square meters per gram surface area and an average pore diameter of 160 angstroms. The reaction was carried out at a temperature of approximately 540° C. and at a space velocity of 0.5 volume of liquid feed per hour per volume of catalyst. The benzene produced represented a 57.9 percent by weight conversion based on the amount of n-hexane charged. The carbon deposition was approximately 2.2 percent by weight based on total catalyst in a 2 hour synthesis cycle.

Example II

The feed composition and the operating conditions as to temperature and space velocity were the same as in Example I. The catalyst was composed of 9 percent by weight $Cr_2O_3$, 5.3 percent by weight $Sb_2O_4$, and 0.9 percent by weight $K_2O$. The support was ⅛ inch diameter alumina pellets of 125 square meters per gram surface area and an average pore diameter of 160 angstroms. The benzene produced represented a 43.4 percent by weight conversion of n-hexane to benzene. The carbon deposition was approximately 1.95 percent by weight based on total catalyst in a 2 hour synthesis cycle.

Example III

The feed composition and the operating conditions as to temperature and space velocity were the same as in Example I. The catalyst was composed of 9 percent by weight $Cr_2O_3$, 2.5 percent by weight $Sb_2O_3$, and 0.7 percent by weight $K_2O$ supported on ⅛ inch diameter alumina pellets of 125 square meters per gram and an average pore diameter of 160 angstroms. The benzene produced represented a 47.9 percent by weight conversion of n-hexane to benzene. The carbon deposition was approximately 2.2 percent by weight based on total catalyst in a 2 hour synthesis cycle.

Example IV

Using a feed consisting of 97.5 mol percent n-hexane and 2.5 mol percent methylcyclopentane and a contact temperature of 540° C. with a space velocity of 0.5 volume of liquid feed per hour per volume of catalyst and a catalyst comprising the alumina base support described in Example I, 9 percent by weight $Cr_2O_3$ and 1.25 percent by weight $K_2O$, the amount of $Sb_2O_4$ was varied with the following results as to carbon deposition.

| Percent by weight $Sb_2O_4$ | Percent by weight carbon |
|---|---|
| none | 2.80 |
| 2.65 | 2.11 |
| 5.30 | 1.98 |

Example V

Using a feed consisting of 97.5 mol percent n-hexane and 2.5 mol percent methylcyclopentane and a contact temperature of 540° C. with a liquid space velocity of 0.5 volume of liquid feed per hour per volume of catalyst and a catalyst comprising the alumina base support described in Example I, 9 percent by weight $Cr_2O_3$ and 2.65 percent by weight $Sb_2O_4$, the amount of $K_2O$ was varied with the following results as to carbon deposition.

| Percent by weight $K_2O$ | Percent by weight carbon |
|---|---|
| none | 2.61 |
| 0.7 | 2.24 |
| 0.9 | 2.18 |
| 1.25 | 2.11 |

The catalyst which is the subject of this invention comprises an oxide of antimony, e.g., $Sb_2O_4$, $Sb_2O_3$, an oxide of an element from the left hand column of group VI of the periodic table, an oxide of an alkali metal and a suitable base support. The left hand column of group VI of the periodic table is made up of chromium, molybdenum, and tungsten. Though the oxides of any of these may be used the oxide of chromium is preferred. Among the alkali metals such as sodium, potassium, rubidium, and cesium, whose oxide may be used in this invention, the preferred oxide is the oxide of potassium. The base support used in the catalyst is preferably alumina of surface area of 125 square meters per gram and with an average pore diameter of approximately 160 angstroms. Supports ranging in surface area from 70 to 350 square meters per gram or higher may be used, however. Also pore diameter ranges of 40 to 320 angstroms and higher may be present in these supports.

It is obvious from the examples given herein that both the oxides of antimony and the alkali metal oxides have a deterring effect upon the formation of carbonaceous deposits. Variations in the alkali metal oxide level does not have as great an effect upon the rate of carbon deposition as does that of the antimony oxides. The yield trend is similar to that of the carbon deposition. As the level of the antimony oxide goes up the yields go down slightly. Conversely as the level of this oxide goes down the yields go up slightly. The same is true for the alkali metal oxide with the exception that below approximately 0.5 percent by weight the trend completely reverses and as the concentration continues to go down beyond that point, the yield drops rather rapidly. The precise amount of each of these two components will be dependent upon the desired balance between yield and carbon deposition and the nature of the specific support used. The amount of antimony oxide may range from approximately 0.1 to 8 percent by weight, the preferred range being from 2.5 to 7.5 percent by weight. The amount of the alkali metal present may be from 0.1 to 3 percent by weight with a preferred range being from 0.5 to 1.5 percent by weight.

The quantity of the oxide of chromium, the preferred oxide of an element from the left hand column of group VI of the periodic table, present in the catalyst may vary somewhat without an appreciable change in amount of carbon deposition and with only a small change in yields. An increase of from 9 to 12 percent by weight chromium oxide brought about a change in the amount of carbon deposited of from 1.98 to 1.91 weight percent. Also the yield rate dropped somewhat with the increase in the quantity of chromium present. The preferred range of quantity of chromium oxide is from 9 to 12 percent by weight when using an alumina of about 125 square meters per gram although both higher and lower amounts of the chromium oxide may be used. This range of concentration may also be applied to the oxides of elements from the left hand side of group VI of the periodic table other than the preferred oxide of chromium if they are used in the catalyst herein disclosed.

The optimum level of antimony oxide, alkali metal oxide and oxide of the left hand column of group VI of the periodic table will vary with the surface area and average pore diameter of the support. Higher surface areas generally require a higher level of each component on a weight percent of catalyst basis.

The catalyst may be prepared by conventional processes such as impregnation, co-gelation, co-precipitation, precipitation, etc. In the method disclosed herein, the alumina support is usually calcined at about 700° C. It is cooled and then thoroughly wetted with a solution containing the first active component, preferably the $Cr_2O_3$ which is added as $CrO_3$. This is followed by filtering off the liquid and drying at 130 to 160° C. for approximately 16 hours. The catalyst is then calcined at 550° C. for approximately 16 hours and then reduced for 1½ hours to prevent loss of $CrO_3$ during the next impregnation. Next, the potassium is placed upon the catalyst from a solution of a potassium salt thermally decomposable to an oxide such as potassium nitrate. The filtering, drying, calcining and reducing steps are then repeated. The entire procedure is then repeated for the antimony which is deposited from some suitable solution of an antimony compound which is thermally decomposable to the oxide. A tartaric acid solution of antimony trioxide is an example of a suitable solution for the impregnation of the antimony oxide.

The order in which the active components are added may be varied with some change in results. By placing the oxide of antimony on the alumina support and then placing the oxide of chromium and/or potassium on the antimony impregnated support, the yield of benzene from hexane increased but the rate of carbon deposition on the catalyst also increased.

In carrying out the process of this invention a suitable temperature must be maintained in the dehydrogenation-cyclization zone. This temperature may be in the range of 510° to 590° C. but more preferably in the range of 535° to 575° C. The optimum yield temperature is very closely related to the space velocity. As the space velocity is increased the optimum yield temperature will also increase. The space velocity may range from 0.1 to 2.0 volumes of liquid feed per hour per volume of catalyst. The preferred rate is approximately 0.5 to 1.0 volume of liquid feed per hour per volume of catalyst.

The pressure at which the process may be operated may range from sub-atmospheric to 100 or more p.s.i.g. It is preferred to operate the process at approximately atmospheric pressure.

The feedstock anticipated for use with the catalyst described herein is one containing an approximate minimum of 90 mol percent n-paraffin and a naphthene maximum of 5 mol percent. This is not to say the invention will not operate with lower paraffin and/or higher naphthene content but the efficiency of the reaction is impaired as the composition is deviated beyond these limits. A low naphthene content is desirable because of the carbon forming tendency of the naphthenes under the relatively severe operating conditions necessary for the dehydrocyclization of n-paraffins. The lower the naphthene content, the longer the reaction may be carried out without a shutdown for regeneration.

The n-paraffin hydrocarbons which may be used in the practice of this invention contain at least 6 carbon atoms and preferably 6 to 12 carbon atoms. This includes n-hexane, n-heptane, n-octane, n-nonane, n-decane, n-undecane, n-dodecane. Branched chain hydrocarbons, preferably slightly branched hydrocarbons of at least 6 carbon atoms e.g., 6 to 12 carbon atoms in one chain also may undergo dehydrocyclization with this invention. Examples of such branched chain paraffin hydrocarbons are methyl hexanes, methyl heptanes, dimethyl hexanes, dimethyl heptanes, ethyl heptanes, etc.

When regeneration becomes necessary due to the carbon deposits on the catalyst surface, practically any conventional method of carbon removal may be used. The thermal stability limits of the catalyst will, of course, limit some potential regeneration techniques. The maximum catalyst temperature limit is approximately 700° C.

A logical inexpensive carbon removal system is air oxidation. Any of several methods may be used for controlling the temperature during the extremely exothermic regeneration. Among these are limitation of regeneration gas flow rates, oxygen content of regeneration gases, use of heat absorbing mediums, high velocity air flow, etc. The heat of regeneration may be removed by conventional heat exchange equipment in a fluidized regeneration system.

The method of contacting the catalyst with the feed may involve either adiabatic or isothermal operations in a fixed, moving or fluidized bed. The fluidized bed may be of the single vessel contained or multi-vessel circulating type. Those skilled in the art will see that a wide variety of mechanical designs of each of these types may serve to carry out the desired aromatic production.

We claim:

1. The process of dehydrogenation and cyclization of paraffinic hydrocarbons to aromatic hydrocarbons comprising contacting paraffinic hydrocarbons of 6 to 12 carbon atoms in a straight-chain at a temperature of 510 to 590° C. and at a velocity of approximately 0.1 to 2.0 volumes of liquid feed per hour per volume of catalyst with a dehydrocyclization catalyst comprising an oxide of antimony, an oxide of an alkali metal, an oxide of an element from the left hand column of group VI of the periodic table and a base support consisting essentially of alumina having a surface area of 50 to 400 square meters per gram and average pore diameter of at least 40 angstroms.

2. The process as described in claim 1 wherein the paraffinic hydrocarbons of 6 to 12 carbon atoms are n-paraffin hydrocarbons.

3. The process as described in claim 1 wherein the paraffinic hydrocarbon is n-hexene.

4. The process as described in claim 1 wherein the oxide of an alkali metal is an oxide of a metal selected from the group consisting of sodium, potassium, rubidium and cesium.

5. The process as described in claim 1 wherein the amount of the oxide of an alkali metal contained in the catalyst is 0.1 to 3 weight percent of the catalyst.

6. The process as described in claim 1 wherein the amount of the oxide of antimony present in the catalyst is 0.1 to 8 percent by weight of the catalyst.

7. The process as described in claim 1 wherein the oxide of an element from the left hand column of group VI of the periodic table is chromium.

8. The process as described in claim 1 wherein the amount of the oxide of an element from the left hand column of group VI of the periodic table present in the catalyst is 9 to 12 percent by weight of the catalyst.

9. The process of dehydrogenation and cyclization of paraffinic hydrocarbons of 6 to 12 carbon atoms and having at least 6 carbon atoms in a straight-chain, the process comprising contacting the paraffinic hydrocarbons at a temperature of 535 to 575° C. and at a space velocity of 0.5 to 1.0 liquid volumes of hydrocarbon per hour per volume of catalyst with a dehydrocyclization catalyst comprising 2.5 to 7.5 percent of weight of an oxide of antimony, 0.5 to 1.5 percent by weight of an oxide of an alkali metal selected from the group consisting of sodium, potassium, rubidium and cesium, and 9 to 12 percent by weight of an oxide of an element from the left hand column of group VI of the periodic table and the remainder a base support consisting of alumina of 50 to 400 square meters per gram surface area and an average pore diameter of at least 40 angstroms.

10. The process as described in claim 9 wherein the alumina has a surface area of 125 square meters per gram and an average pore diameter of 160 angstroms.

11. The process as described in claim 10 wherein the oxide of an alkali metal is the oxide of potassium and wherein the oxide of an element from the left hand column of group VI of the periodic table is an oxide of chromium.

References Cited in the file of this patent

UNITED STATES PATENTS

| | | |
|---|---|---|
| 2,250,415 | Burk et al. | July 22, 1941 |
| 2,410,044 | Burk et al. | Oct. 29, 1946 |
| 2,668,142 | Strecker et al. | Feb. 2, 1954 |
| 2,754,345 | Kirshenbaum | July 10, 1956 |
| 2,785,209 | Schmetterling et al. | Mar. 12, 1957 |
| 2,857,442 | Hay | Oct. 21, 1958 |